US009983873B2

(12) United States Patent
Toll et al.

(10) Patent No.: US 9,983,873 B2
(45) Date of Patent: *May 29, 2018

(54) SYSTEMS, APPARATUSES, AND METHODS FOR PERFORMING MASK BIT COMPRESSION

(71) Applicant: Intel Corporation, Santa Clara, CA (US)

(72) Inventors: Bret L. Toll, Hillsboro, OR (US); Robert Valentine, Kiryat Tivon (IL); Jesus Corbal, Barcelona (ES); Elmoustapha Ould-Ahmed-Vall, Chandler, AZ (US); Mark J. Charney, Lexington, MA (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/169,297

(22) Filed: May 31, 2016

(65) Prior Publication Data

US 2017/0024206 A1    Jan. 26, 2017

Related U.S. Application Data

(63) Continuation of application No. 13/992,709, filed as application No. PCT/US2011/067081 on Dec. 23, 2011, now Pat. No. 9,354,877.

(51) Int. Cl.
*G06F 9/30* (2018.01)

(52) U.S. Cl.
CPC ...... *G06F 9/30018* (2013.01); *G06F 9/30181* (2013.01)

(58) Field of Classification Search
None
See application file for complete search history.

(56) References Cited

U.S. PATENT DOCUMENTS

| 4,490,786 | A | 12/1984 | Nakatani |
| 4,881,168 | A | 11/1989 | Inagami et al. |
| 6,446,198 | B1 | 9/2002 | Sazegari |
| 6,671,797 | B1 * | 12/2003 | Golston ............ G06F 9/30036 712/213 |
| 7,095,808 | B1 | 8/2006 | Shohara |
| 9,323,531 | B2 * | 4/2016 | Hughes ............. G06F 9/30152 |
| 9,354,877 | B2 * | 5/2016 | Toll .................... G06F 9/30098 |

(Continued)

FOREIGN PATENT DOCUMENTS

| CN | 101206635 A | 6/2008 |
| TW | 200917228 A | 4/2009 |
| TW | 200935304 A | 8/2009 |

OTHER PUBLICATIONS

Intel 64 and IA-32 Architectures Software Developer's, Manual 544 pgs., (Jun. 2014).

(Continued)

*Primary Examiner* — Cheng-Yuan Tseng
(74) *Attorney, Agent, or Firm* — Nicholson De Vos Webster & Elliott LLP

(57) ABSTRACT

Embodiments of systems, apparatuses, and methods for performing in a computer processor mask bit compression in response to a single mask bit compression instruction that includes a source writemask register operand, a destination writemask register operand, and an opcode are described.

18 Claims, 17 Drawing Sheets

(56) References Cited

U.S. PATENT DOCUMENTS

| | | | |
|---|---|---|---|
| 9,411,593 B2 * | 8/2016 | Jha | G06F 9/30145 |
| 9,703,558 B2 * | 7/2017 | Lee | G06F 9/30021 |
| 2003/0105945 A1 | 6/2003 | Wolff et al. | |
| 2009/0019269 A1 | 1/2009 | Wolff et al. | |

OTHER PUBLICATIONS

Intel Advanced Vector Extensions 36945-319433-011, Manual 595 pgs., (Jun. 2011).

PCT International Search Report for PCT Counterpart Application No. PCT/US2011/067081, 3 pgs., (Aug. 27, 2012).

PCT Written Opinion of the International Search Authority for PCT Counterpart Application No. PCT/US2011/067081, 5 pgs., (Aug. 27, 2012).

PCT Notification concerning Transmittal of International Preliminary Report on Patentability (Chapter I of the Patent Cooperation Treaty) for PCT Counterpart Application No. PCT/US2011/067081, 7 pgs., (Jul. 3, 2014).

Office action and Search Report with English translation of Search Report from Chinese Patent Application No. 201180075780.0, dated Sep. 26, 2016, 15pages.

Office action and Search Report with English translation of Search Report from Taiwan Patent Application No. 101148331, dated Apr. 22, 2015, 6 pages.

* cited by examiner

| OPCODE/ INSTRUCTION | 64/32 BIT MODE SUPPORT | DESCRIPTION |
|---|---|---|
| VEX.128.0F.W0 94 /R KCOMPRESSD K1, K2 | V/V | COMPRESS MASK BITS SET TO 1 IN K2 AND WRITE THE RESULT TO K1 |
| VEX.128.0F.W0 94 /R KCOMPRESSQ K1, K2 | V/V | COMPRESS MASK BIT SETS TO 1 FROM THE LOWEST 8 BITS OF K2 AND WRITE THE RESULT TO K1 |

FIG. 2

```
OPERATION
KCOMPRESSD
DEST[15:0] ← 0
I ← 0
FOR J  0 TO 15
      IF K2[J]
            THEN
                  DEST[I] ← 1
                  I ← I=1

FI;
ENDFOR

KCOMRPESSQ
DEST[15:0] ← 0
I ← 0
FOR J ← 0 TO 7
      IF KW[J]
            THEN
                  DEST[I] 1
                  I ← I-1
FI;
ENDFOR
```

FIG. 5

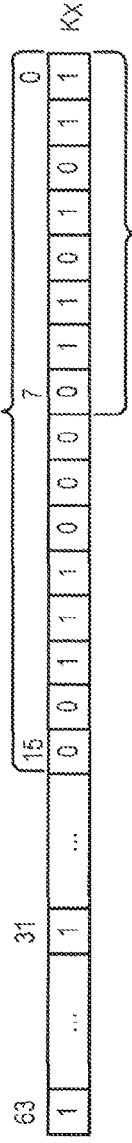
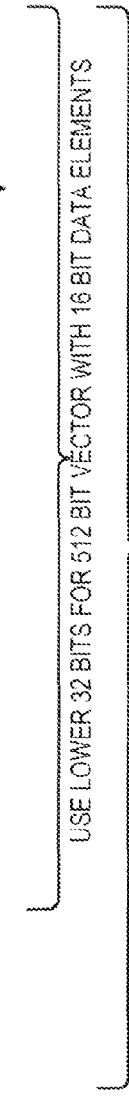
FIGURE 6

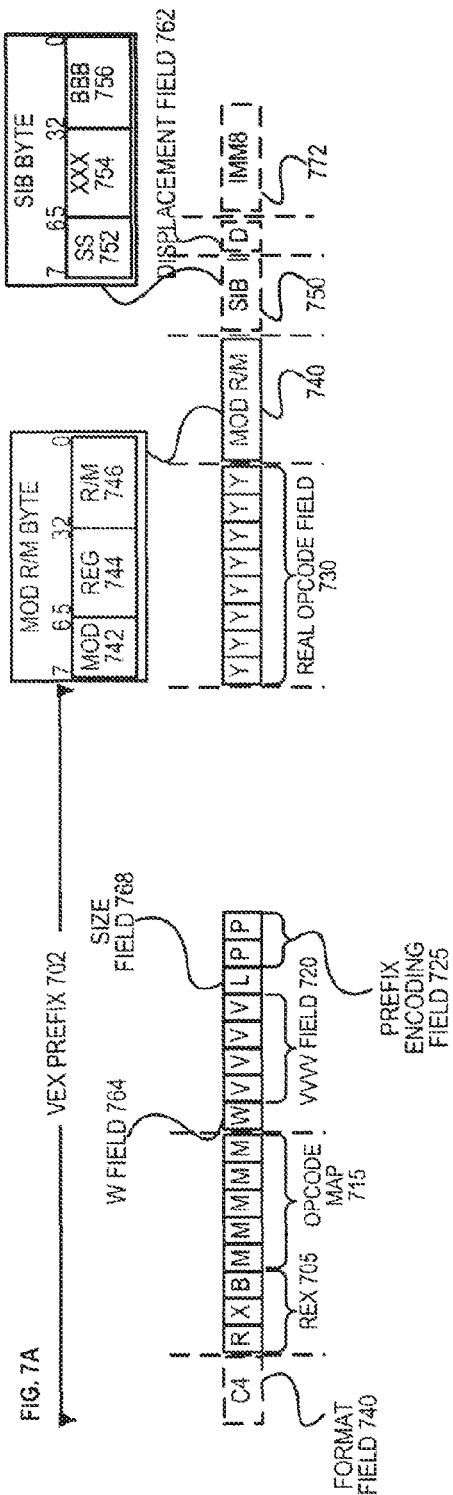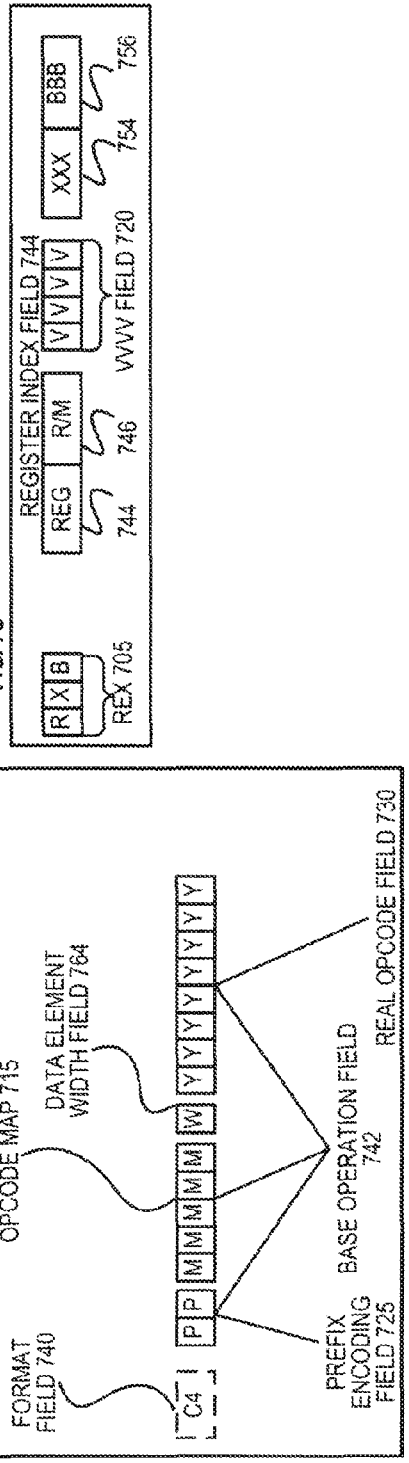

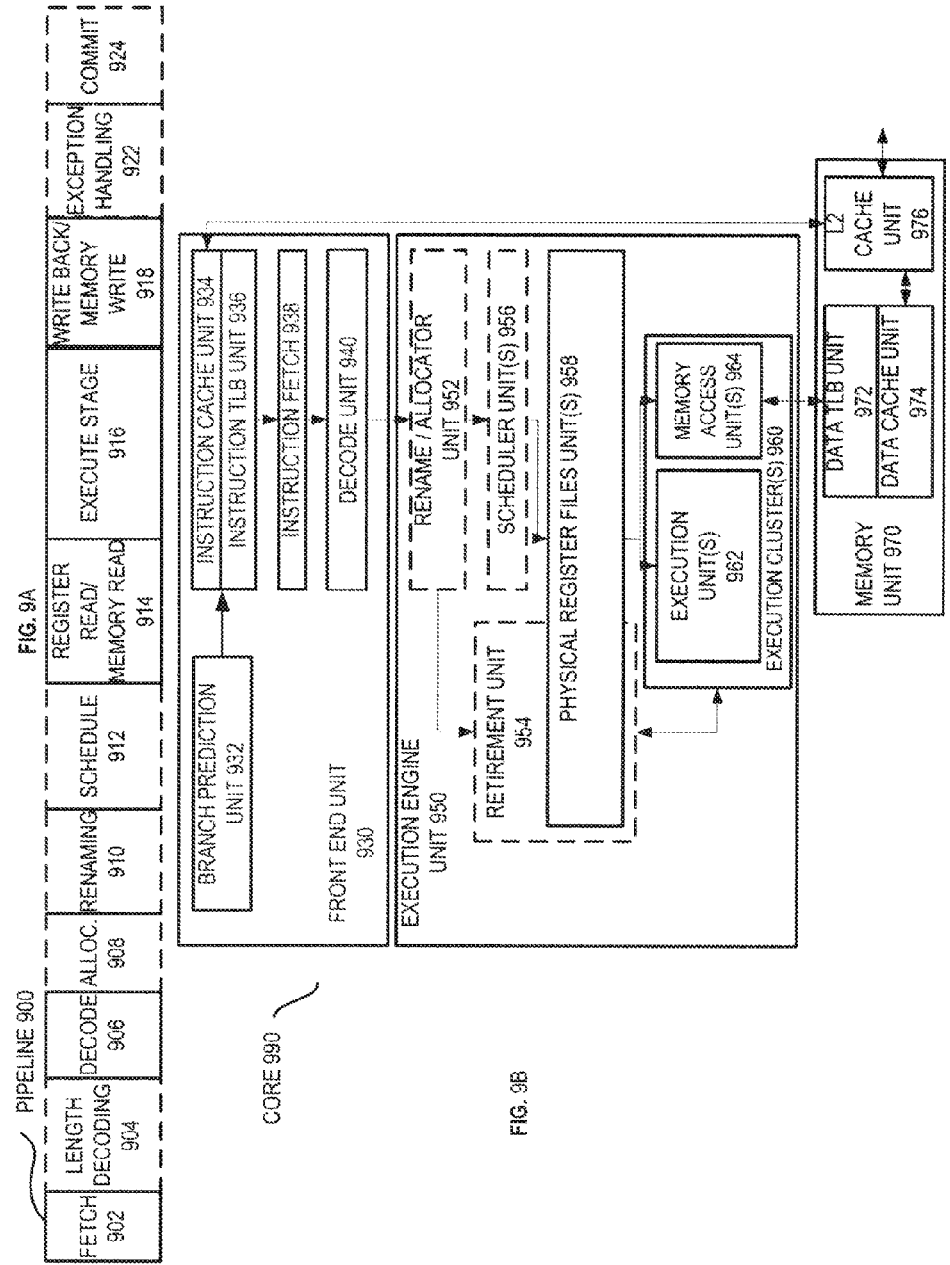

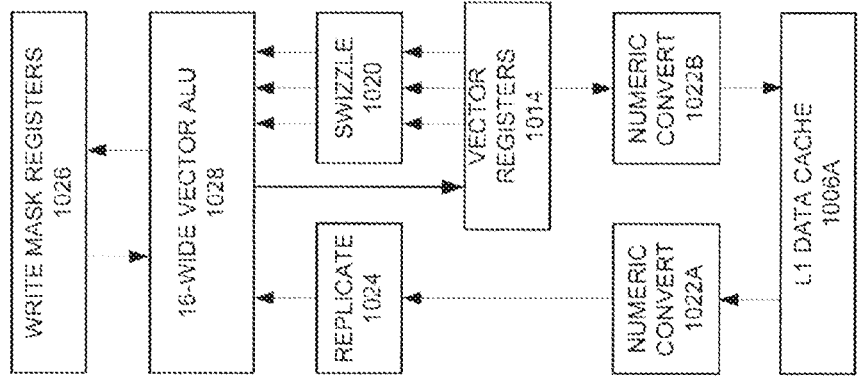
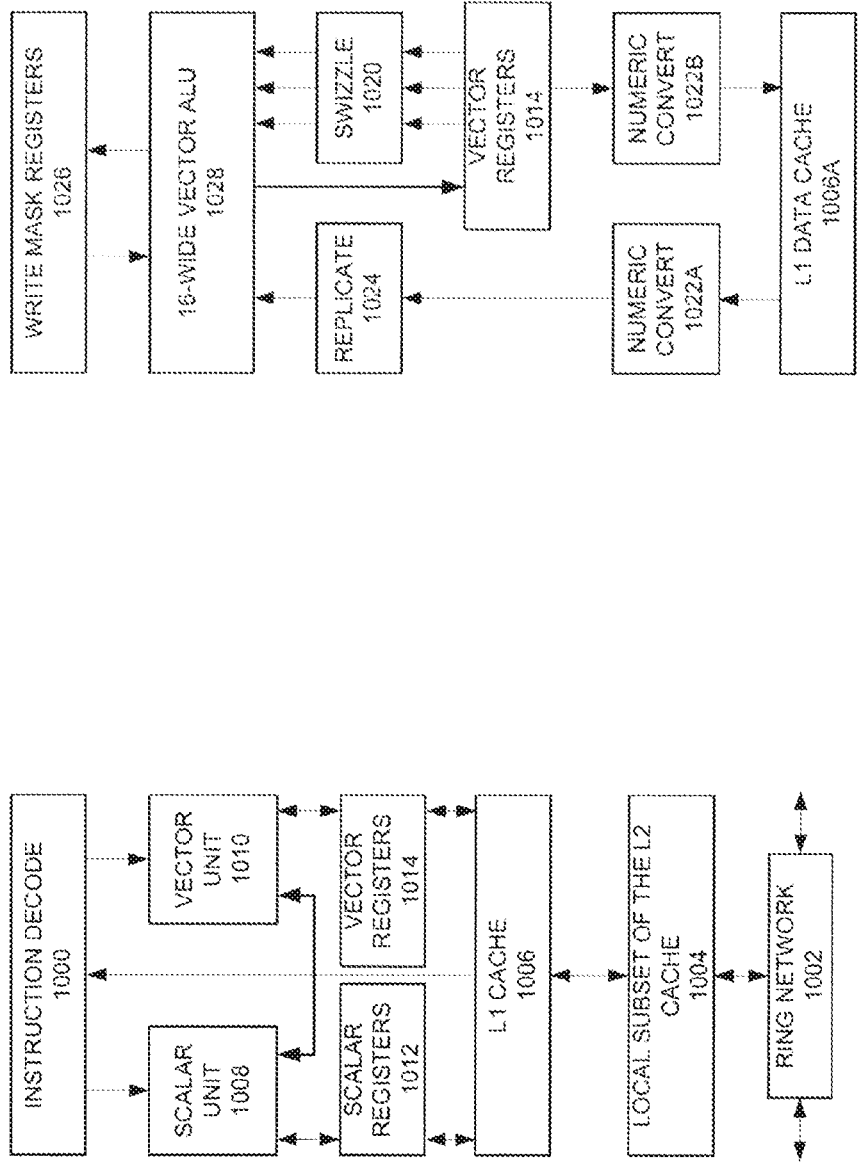

SYSTEMS, APPARATUSES, AND METHODS FOR PERFORMING MASK BIT COMPRESSION

FIELD OF INVENTION

The field of invention relates generally to computer processor architecture, and, more specifically, to instructions which when executed cause a particular result.

BACKGROUND

An instruction set, or instruction set architecture (ISA), is the part of the computer architecture related to programming, and may include the native data types, instructions, register architecture, addressing modes, memory architecture, interrupt and exception handling, and external input and output (I/O). The term instruction generally refers herein to macro-instructions—that is instructions that are provided to the processor (or instruction converter that translates (e.g., using static binary translation, dynamic binary translation including dynamic compilation), morphs, emulates, or otherwise converts an instruction to one or more other instructions to be processed by the processor) for execution—as opposed to micro-instructions or micro-operations (micro-ops)—that is the result of a processor's decoder decoding macro-instructions.

The ISA is distinguished from the microarchitecture, which is the internal design of the processor implementing the instruction set. Processors with different microarchitectures can share a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB), and a retirement register file; the use of multiple maps and a pool of registers), etc. Unless otherwise specified, the phrases register architecture, register file, and register are used herein to refer to that which is visible to the software/programmer and the manner in which instructions specify registers. Where a specificity is desired, the adjective logical, architectural, or software visible will be used to indicate registers/files in the register architecture, while different adjectives will be used to designation registers in a given microarchitecture (e.g., physical register, reorder buffer, retirement register, register pool).

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) often require the same operation to be performed on a large number of data items (referred to as "data parallelism"). Single Instruction Multiple Data (SIMD) refers to a type of instruction that causes a processor to perform an operation on multiple data items. SIMD technology is especially suited to processors that can logically divide the bits in a register into a number of fixed-sized data elements, each of which represents a separate value. For example, the bits in a 256-bit register may be specified as a source operand to be operated on as four separate 64-bit packed data elements (quad-word (Q) size data elements), eight separate 32-bit packed data elements (double word (D) size data elements), sixteen separate 16-bit packed data elements (word (W) size data elements), or thirty-two separate 8-bit data elements (byte (B) size data elements). This type of data is referred to as packed data type or vector data type, and operands of this data type are referred to as packed data operands or vector operands. In other words, a packed data item or vector refers to a sequence of packed data elements, and a packed data operand or a vector operand is a source or destination operand of a SIMD instruction (also known as a packed data instruction or a vector instruction).

By way of example, one type of SIMD instruction specifies a single vector operation to be performed on two source vector operands in a vertical fashion to generate a destination vector operand (also referred to as a result vector operand) of the same size, with the same number of data elements, and in the same data element order. The data elements in the source vector operands are referred to as source data elements, while the data elements in the destination vector operand are referred to a destination or result data elements. These source vector operands are of the same size and contain data elements of the same width, and thus they contain the same number of data elements. The source data elements in the same bit positions in the two source vector operands form pairs of data elements (also referred to as corresponding data elements; that is, the data element in data element position 0 of each source operand correspond, the data element in data element position 1 of each source operand correspond, and so on). The operation specified by that SIMD instruction is performed separately on each of these pairs of source data elements to generate a matching number of result data elements, and thus each pair of source data elements has a corresponding result data element. Since the operation is vertical and since the result vector operand is the same size, has the same number of data elements, and the result data elements are stored in the same data element order as the source vector operands, the result data elements are in the same bit positions of the result vector operand as their corresponding pair of source data elements in the source vector operands. In addition to this exemplary type of SIMD instruction, there are a variety of other types of SIMD instructions (e.g., that has only one or has more than two source vector operands, that operate in a horizontal fashion, that generates a result vector operand that is of a different size, that has a different size data elements, and/or that has a different data element order). It should be understood that the term destination vector operand (or destination operand) is defined as the direct result of performing the operation specified by an instruction, including the storage of that destination operand at a location (be it a register or at a memory address specified by that instruction) so that it may be accessed as a source operand by another instruction (by specification of that same location by the another instruction).

The SIMD technology, such as that employed by the Intel® Core™ processors having an instruction set including x86, MMX™, Streaming SIMD Extensions (SSE), SSE2, SSE3, SSE4.1, and SSE4.2 instructions, has enabled a significant improvement in application performance. An additional set of SIMD extensions, referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2011; and see Intel® Advanced Vector Extensions Programming Reference, June 2011).

BRIEF DESCRIPTION OF THE DRAWINGS

The present invention is illustrated by way of example and not limitation in the figures of the accompanying drawings, in which like references indicate similar elements and in which:

FIG. 2 illustrates more detailed embodiments of formats of this instruction in the VEX format.

FIG. 5 illustrates exemplary pseudo-code versions for this instruction.

FIG. 6 illustrates a correlation between the number of one active bit vector writemask elements and the vector size and the data element size according to one embodiment of the invention.

FIG. 7A illustrates an exemplary AVX instruction format.

FIG. 7B illustrates which fields from FIG. 7A make up a full opcode field and a base operation field.

FIG. 7C illustrates which fields from FIG. 7A make up a register index field.

FIG. 9A is a block diagram illustrating both an exemplary in-order pipeline and an exemplary register renaming, out-of-order issue/execution pipeline according to embodiments of the invention.

FIG. 9B is a block diagram illustrating both an exemplary embodiment of an in-order architecture core and an exemplary register renaming, out-of-order issue/execution architecture core to be included in a processor according to embodiments of the invention.

FIGS. 10A-B illustrate a block diagram of a more specific exemplary in-order core architecture, which core would be one of several logic blocks (including other cores of the same type and/or different types) in a chip

DETAILED DESCRIPTION

Figure 1A:
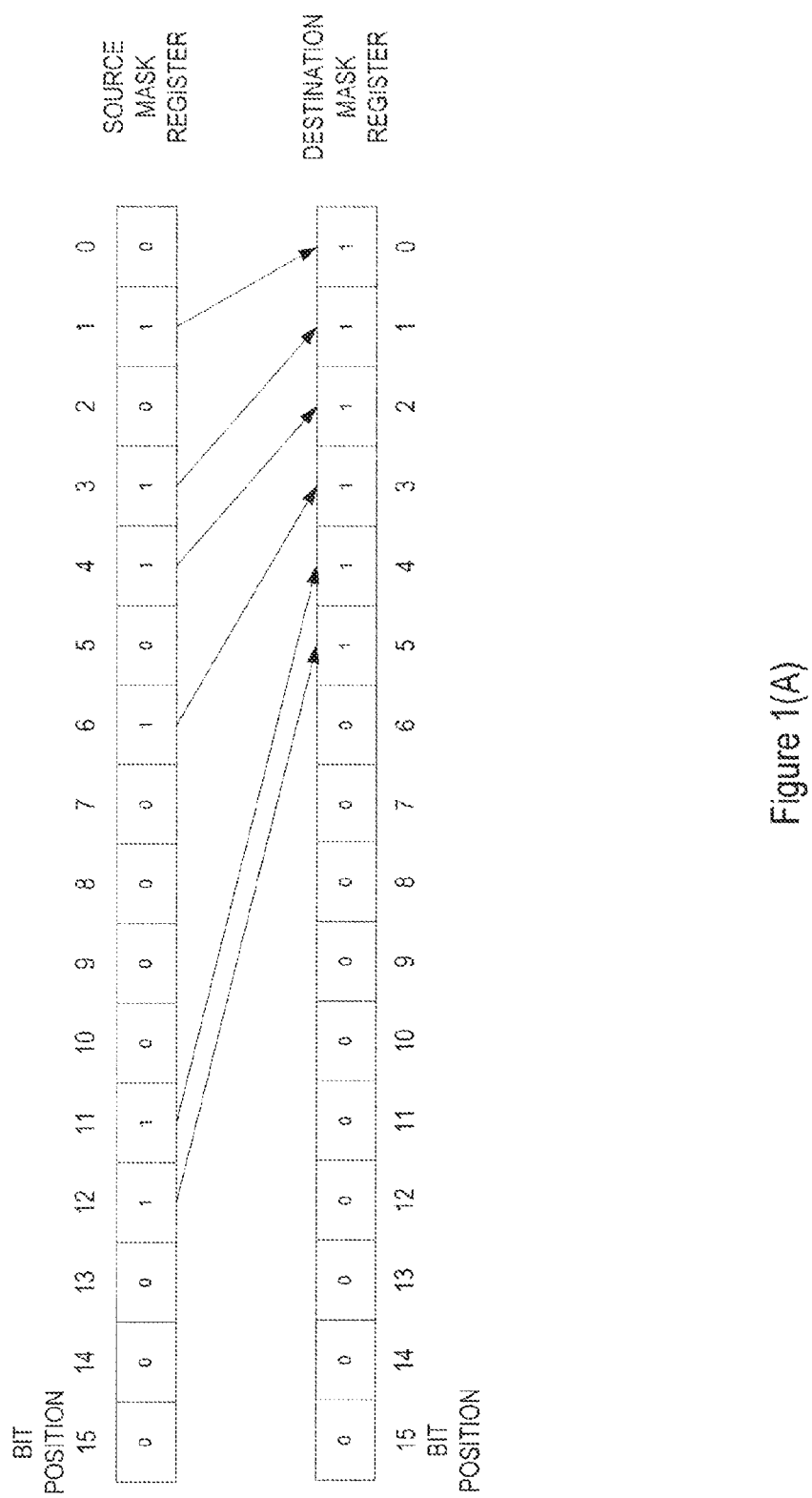
FIG. 1(A) illustrates an exemplary illustration of an operation of exemplary instructions for KCOMPRESS.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Overview

In the description below, there are some items that may need explanation prior to describing the operations of this particular instruction in the instruction set architecture. One such item is called a "writemask register" which is generally used to predicate an operand to conditionally control per-element computational operation (below, the term mask register may also be used and it refers to a writemask register such as the "k" registers discussed below). As used below, a writemask register stores a plurality of bits (16, 32, 64, etc.) wherein each active bit of the writemask register governs the operation/update of a packed data element of a vector register during SIMD processing. Typically, there is more than one writemask register available for use by a processor core.

The instruction set architecture includes at least some SIMD instructions that specify vector operations and that have fields to select source registers and/or destination registers from these vector registers (an exemplary SIMD instruction may specify a vector operation to be performed on the contents of one or more of the vector registers, and the result of that vector operation to be stored in one of the vector registers). Different embodiments of the invention may have different sized vector registers and support more/less/different sized data elements.

The size of the multi-bit data elements specified by a SIMD instruction (e.g., byte, word, double word, quad word) determines the bit locations of the "data element positions" within a vector register, and the size of the vector operand determines the number of data elements. A packed data element refers to the data stored in a particular position. In other words, depending on the size of the data elements in the destination operand and the size of the destination operand (the total number of bits in the destination operand) (or put another way, depending on the size of the destination operand and the number of data elements within the destination operand), the bit locations of the multi-bit data element positions within the resulting vector operand change (e.g., if the destination for the resulting vector operand is a vector register, then the bit locations of the multi-bit data element positions within the destination vector register change). For example, the bit locations of the multi-bit data elements are different between a vector operation that operates on 32-bit data elements (data element position 0 occupies bit locations 31:0, data element position 1 occupies bit locations 63:32, and so on) and a vector operation that operates on 64-bit data elements (data element position 0 occupies bit locations 63:0, data element position 1 occupies bit locations 127:64, and so on).

Additionally, there is a correlation between the number of one active bit vector writemask elements and the vector size and the data element size according to one embodiment of the invention as illustrated in FIG. 6. Vector sizes of 128-bits, 256-bits, and 512-bits are shown, although other widths are also possible. Data element sizes of 8-bit bytes (B), 16-bit words (W), 32-bit doublewords (D) or single precision floating point, and 64-bit quadwords (Q) or double precision floating point are considered, although other widths are also possible. As shown, when the vector size is 128-bits, 16-bits may be used for masking when the vector's data element size is 8-bits, 8-bits may be used for masking when the vector's data element size is 16-bits, 4-bits may be used for masking when the vector's data element size is 32-bits, and 2-bits may be used for masking when the vector's data element size is 64-bits. When the vector size is 256-bits, 32-bits may be used for masking when the packed data element width is 8-bits, 16-bits may be used for masking when the vector's data element size is 16-bits, 8-bits may be used for masking when the vector's data element size is 32-bits, and 4-bits may be used for masking when the vector's data element size is 64-bits. When the vector size is 512-bits, 64-bits may be used for masking when the vector's data element size is 8-bits, 32-bits may be used for masking when the vector's data element size is 16-bits, 16-bits may be used for masking when the vector's data element size is 32-bits, and 8-bits may be used for masking when the vector's data element size is 64-bits.

Depending upon the combination of the vector size and the data element size, either all 64-bits, or only a subset of the 64-bits, may be used as a write mask. Generally, when a single, per-element masking control bit is used, the number of bits in the vector writemask register used for masking (active bits) is equal to the vector size in bits divided by the vector's data element size in bits.

As noted above, writemask registers contain mask bits that correspond to elements in a vector register (or memory location) and track the elements upon which operations should be performed. For this reason, it is desirable to have common operations which replicate similar behavior on these mask bits as for the vector registers and in general allow one to adjust these mask bits within the writemask registers.

Below are embodiments of an instruction generically called a write Mask bit compression ("KCOMPRESS") instruction and embodiments of systems, architectures, instruction formats, etc. that may be used to execute such an instruction that is beneficial in several different areas. The execution of a KCOMPRESS instruction causes at least some of the writemask bits set to "1" of a source writemask register to be written to the least significant bits of a destination writemask register.

FIG. 1(A) illustrates an exemplary illustration of an operation of exemplary instructions for KCOMPRESS. In the illustrated example both of the writemask registers are 16 bits in size with 16 writemask bits (each bit position represents a writemask). Of course, different writemask register sizes such as 32- or 64-bit may be used.

In this example, all 16 bits of the source writemask register are evaluated for compression into the destination writemask register.

As illustrated, bit positions 1, 3, 4, 6, 11, and 12 have a "1" value in the source writemask register. These six writemasks are compressed into the six least significant bit positions of the destination writemask register.

Figure 1B:
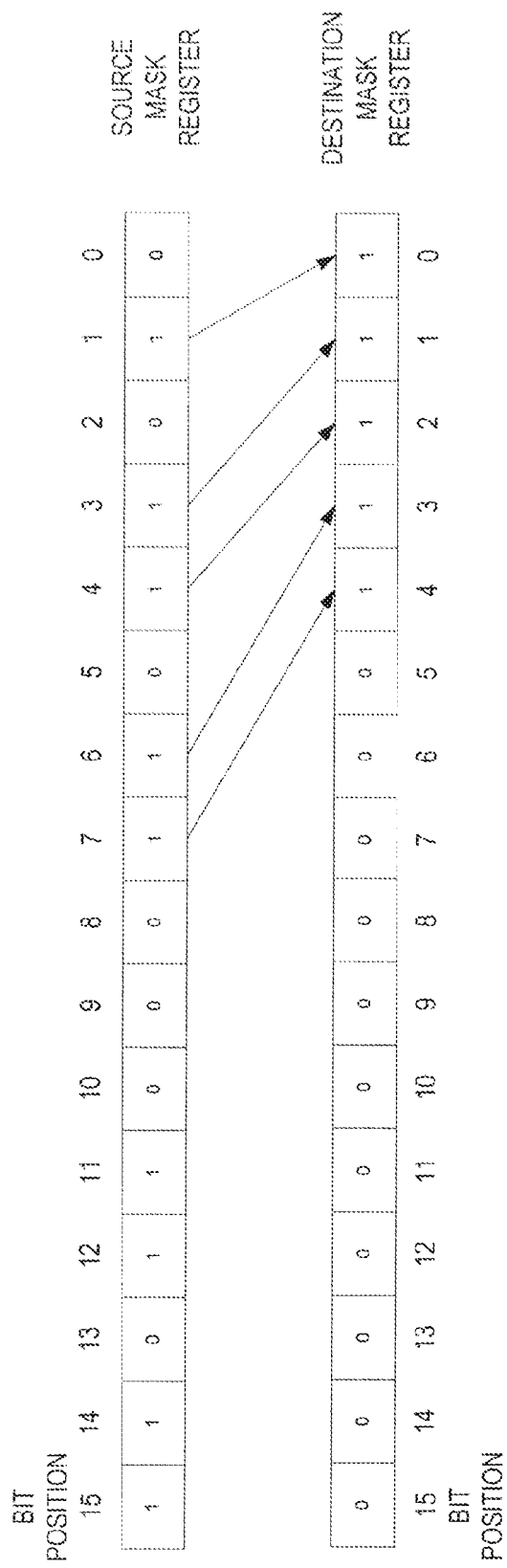
FIG. 1(B) illustrates another exemplary illustration of an operation of exemplary instructions for KCOMPRESS.

FIG. 1(B) illustrates another exemplary illustration of an operation of exemplary instructions for KCOMPRESS. In the illustrated example both of the writemask registers are 16 bits in size with 16 writemask bits (each bit position represents a writemask). As with FIG. 1(A) different writemask register sizes such as 32 and 64-bit may be used. However, in this example, only the least significant 8 bits (active bits) of the source writemask register are evaluated for compression into the destination writemask register. As illustrated, although bit positions 1, 3, 4, 6, 7, 11, 12, 14, and 15 have a "1" value in the source writemask register only writemasks 1, 3, 4, 6, and 7 are compressed into the five least significant bit positions of the destination writemask register.

The number of bits that are to be evaluated for compression may be determined by the opcode associated with the instruction as detailed in the exemplary formats below.

Exemplary Formats

An exemplary format of this instruction is "KCOMPRESSD K1, K2" where K1 and K2 are writemask registers register and KCOMPRESSD is the instruction's opcode. K2 is the destination writemask register and K1 is the source mask register. The execution of this instruction all writemask bits set to "1" of a K2 to be written to the least significant bits of a K1.

An exemplary format of this instruction is "KCOMPRESSQ K1, K2" where K1 and K2 are writemask registers register and KCOMPRESSQ is the instruction's opcode. K2 is the destination writemask register and K1 is the source mask register. The execution of this instruction only the writemask bits set to "1" from the 8 least significant writemask bits of a K2 to be written to the least significant bits of a K1.

FIG. 2 illustrates more detailed embodiments of formats of this instruction.

Exemplary Methods of Execution

Figure 3:
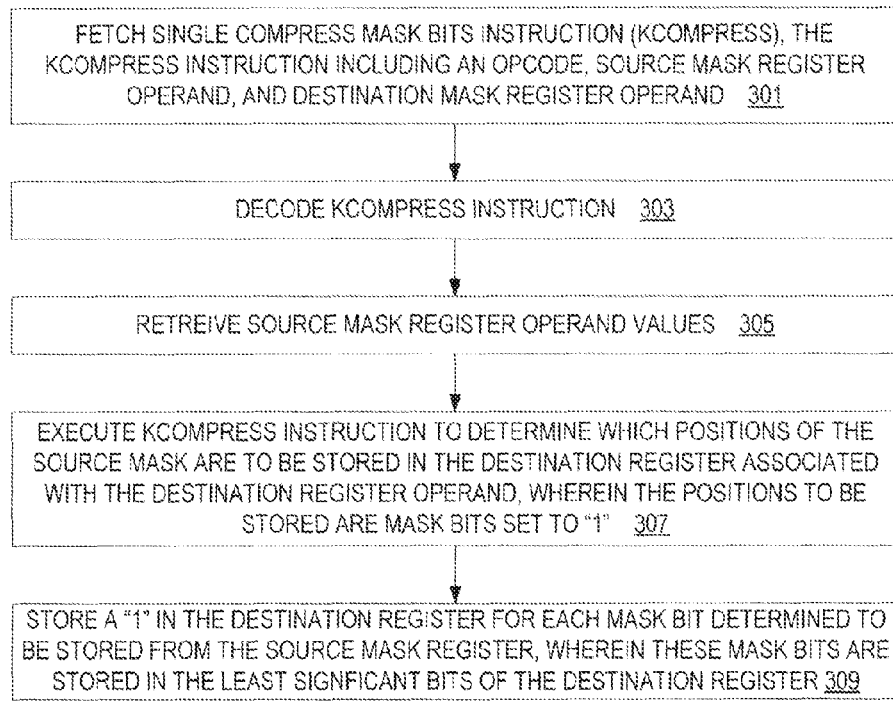
FIG. 3 illustrates an embodiment of the use of a KCOMPRESS instruction in a processor.

FIG. 3 illustrates an embodiment of the use of a KCOMPRESS instruction in a processor. A KCOMPRESS instruction with a destination mask register operand and a source mask register operand is fetched at 301.

The KCOMPRESS instruction is decoded by decoding logic at 303. Depending on the instruction's format, a variety of data may be interpreted at this stage such as if there is to be a data transformation, which registers to write to and retrieve, what memory address to access, etc. This decoding, in some embodiments, determines the number mask bits to evaluate.

The source operand values are retrieved/read at 305. For example, the source register is read.

The KCOMPRESS instruction (or operations comprising such an instruction such as microoperations) is executed by execution resources such as one or more functional units at 307 to determine which of the writemask bits set to "1" of a source writemask register are to be written to the least significant bits of a destination writemask register.

The identified writemask bits are stored in the least significant bits of the destination writemask register at 309. While 307 and 309 have been illustrated separately, in some embodiments they are performed together as a part of the execution of the instruction.

Figure 4:
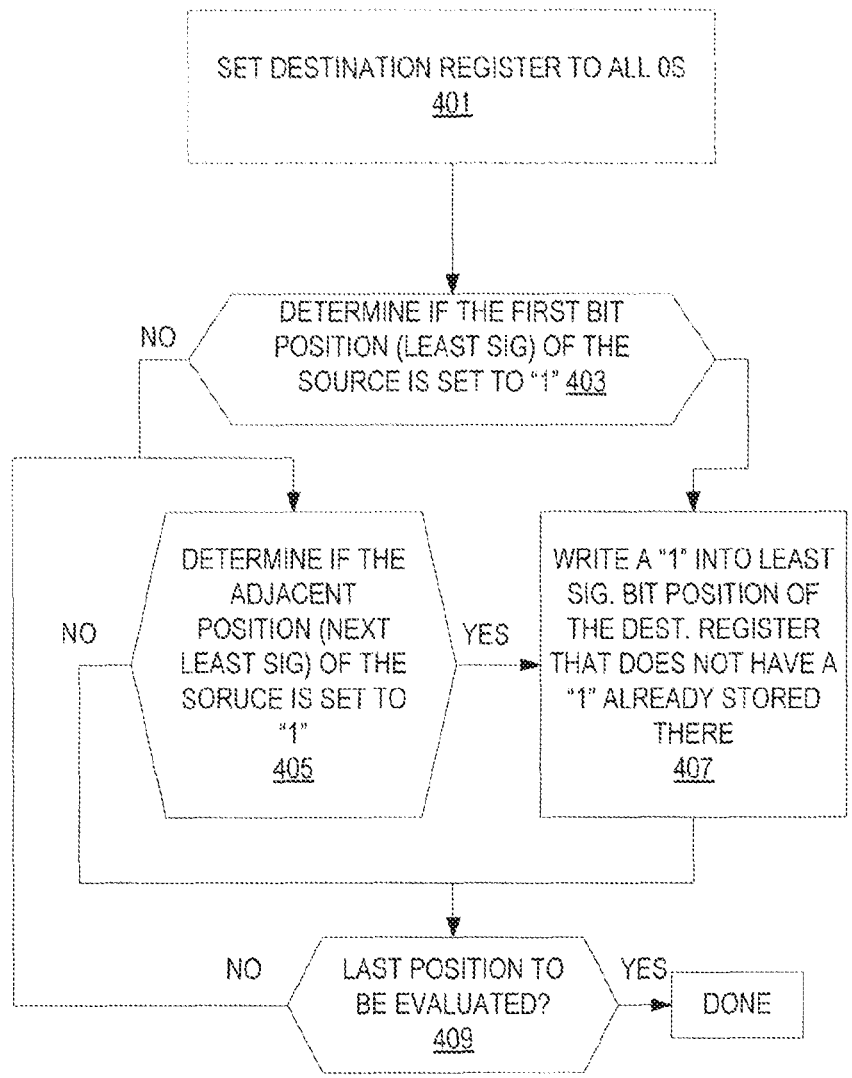
FIG. 4 illustrates an embodiment of a method for processing a KCOMPRESS instruction using addition.

FIG. 4 illustrates an embodiment of a method for processing a KCOMPRESS instruction using addition. In this embodiment it is assumed that some, if not all, of the operations 301-305 have been performed earlier, however, they are not shown in order to not obscure the details presented below. For example, the fetching and decoding are not shown, nor is the operand retrieval shown. In some embodiments, all of the bits of the destination writemask register are set to "0" prior any compression based upon the source writemask register at 401.

At 403, a determination of if the first (least significant) bit position of the source writemask register is set to "1" is made. If set to "1," that indicates that a writemask has been set and should be compressed into the destination writemask register.

If the determination is negative, then a determination is made if the adjacent (next least significant) bit position of the source writemask register is set to "1" is made at 405. Again, if set to "1," that indicates that a writemask has been set and should be compressed into the destination writemask register.

When either of the above determinations is affirmative, then that "1" is written into the least significant bit position of the destination writemask register that does not already have a "1" stored there at 407.

After writing a "1" to the destination writemask register or the determination step of 405, a check is made is if the last bit position of the source writemask register has been evaluated is made at 409. As detailed above, the number of bit positions to evaluate may change depending upon the opcode of the instruction. In some embodiments, this check is not made until 8 bits of the source writemask register have been evaluated.

If the all of the bit positions to be evaluated have been evaluated then the operations of the instruction are complete. If not, then the method continues at 403 and the next least significant bit of the source writemask register is evaluated.

Of course other variations are possible. For example, the execution of the instruction may cause a counter value to be maintained for each "1" found in the source writemask register. In other words, a determination is made for each bit position of what its value is and a running count is kept for each "1" found. Using that counter, the counter value number of least significant bits of the destination writemask will then be set to "1."

FIG. 5 illustrates exemplary pseudo-code versions for this instruction.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 128 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 7A illustrates an exemplary AVX instruction format including a VEX prefix 702, real opcode field 730, Mod R/M byte 740, SIB byte 750, displacement field 762, and IMM8 772. FIG. 7B illustrates which fields from FIG. 7A make up a full opcode field 774 and a base operation field 742. FIG. 7C illustrates which fields from FIG. 7A make up a register index field 744.

VEX Prefix (Bytes 0-2) 702 is encoded in a three-byte form. The first byte is the Format Field 740 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 705 (VEX Byte 1, bits [7-5]) consists of a VEX.R bit field (VEX Byte 1, bit [7]-R), VEX.X bit field (VEX byte 1, bit [6]-X), and VEX.B bit field (VEX byte 1, bit[5]-B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 715 (VEX byte 1, bits [4:0]-mmmmm) includes content to encode an implied leading opcode byte. W Field 764 (VEX byte 2, bit [7]-W)—is represented by the notation VEX.W, and provides different functions depending on the instruction. The role of VEX.vvvv 720 (VEX Byte 2, bits [6:3]-vvvv) may include the following: 1) VEX.vvvv encodes the first source register operand, specified in inverted (1 s complement) form and is valid for instructions with 2 or more source operands; 2) VEX.vvvv encodes the destination register operand, specified in 1 s complement form for certain vector shifts; or 3) VEX.vvvv does not encode any operand, the field is reserved and should contain 1111b. If VEX.L 768 Size field (VEX byte 2, bit [2]-L)=0, it indicates 128 bit vector; if VEX.L=1, it indicates 256 bit vector. Prefix encoding field 725 (VEX byte 2, bits [1:0]-pp) provides additional bits for the base operation field.

Real Opcode Field 730 (Byte 3) is also known as the opcode byte. Part of the opcode is specified in this field.

MOD R/M Field 740 (Byte 4) includes MOD field 742 (bits [7-6]), Reg field 744 (bits [5-3]), and R/M field 746 (bits [2-0]). The role of Reg field 744 may include the following: encoding either the destination register operand or a source register operand (the rrr of Rrrr), or be treated as an opcode extension and not used to encode any instruction operand. The role of R/M field 746 may include the following: encoding the instruction operand that references a memory address, or encoding either the destination register operand or a source register operand.

Scale, Index, Base (SIB)—The content of Scale field 750 (Byte 5) includes SS752 (bits [7-6]), which is used for memory address generation. The contents of SIB.xxx 754 (bits [5-3]) and SIB.bbb 756 (bits [2-0]) have been previously referred to with regard to the register indexes Xxxx and Bbbb.

The Displacement Field 762 and the immediate field (IMM8) 772 contain address data.

Exemplary Register Architecture

Figure 8:
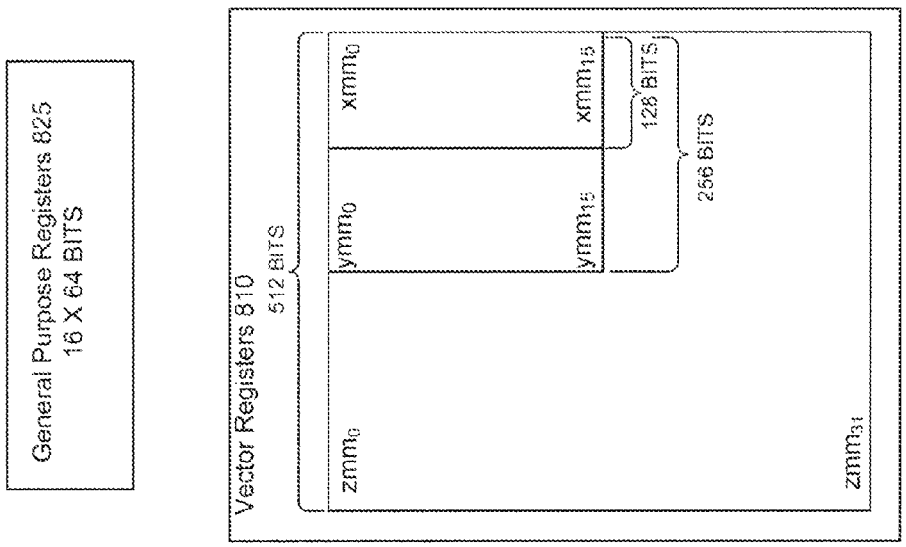
FIG. 8 is a block diagram of a register architecture according to one embodiment of the invention

FIG. 8 is a block diagram of a register architecture 800 according to one embodiment of the invention. In the embodiment illustrated, there are 32 vector registers 810 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

Write mask registers 815—in the embodiment illustrated, there are 8 write mask registers (k0 through k7), each 64 bits in size. In an alternate embodiment, the write mask registers 815 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 845, on which is aliased the MMX packed integer flat register file 850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Processor with Integrated Memory Controller and Graphics

Figure 11:
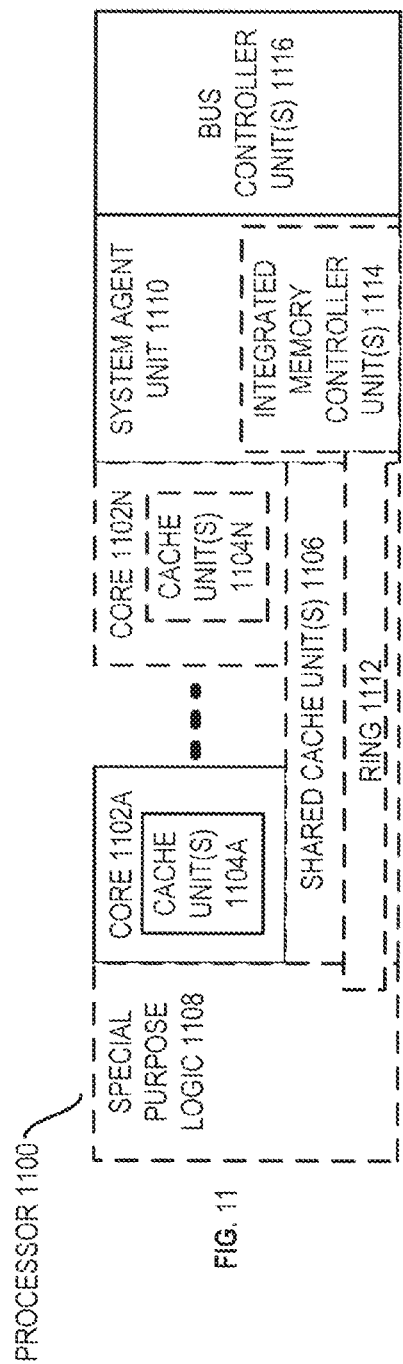
FIG. 11 is a block diagram of a processor that may have more than one core, may have an integrated memory controller, and may have integrated graphics according to embodiments of the invention.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
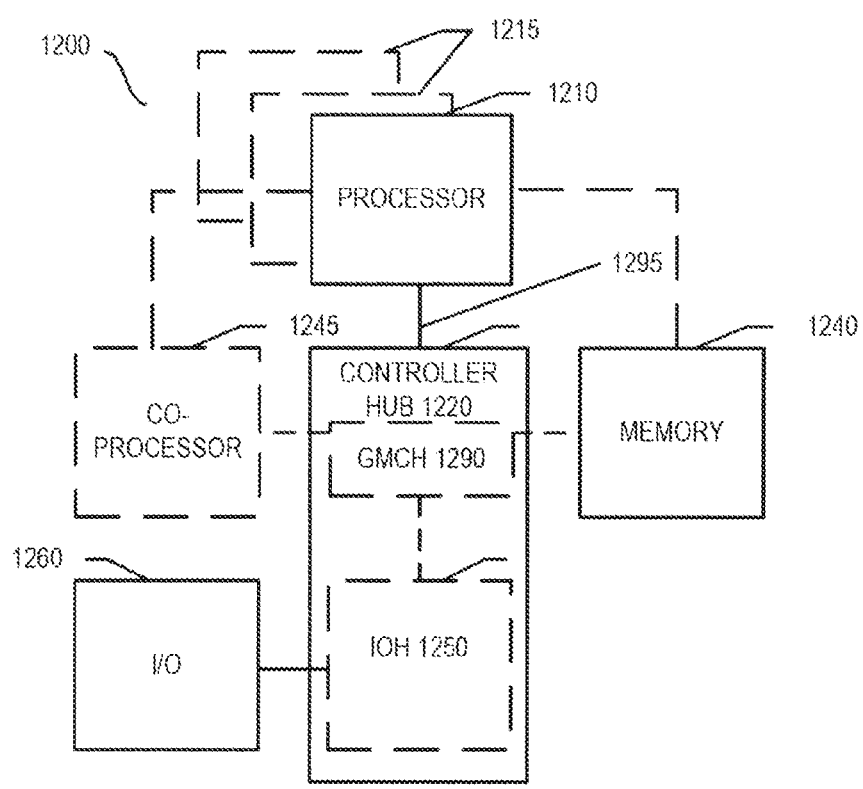
FIG. 12 is a block diagram of a system in accordance with one embodiment of the present invention.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
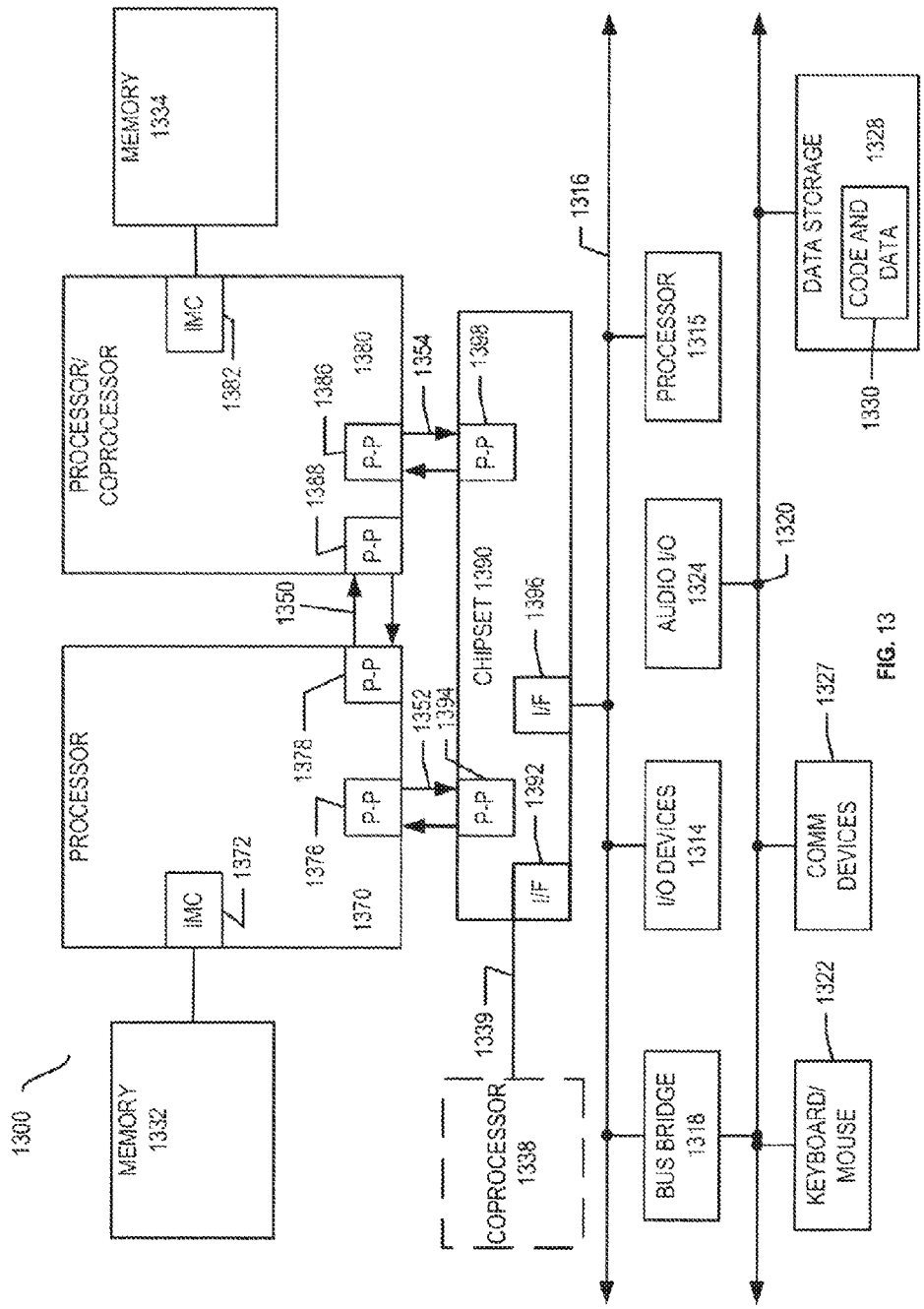
FIG. 13, is a block diagram of a first more specific exemplary system in accordance with an embodiment of the present invention.

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
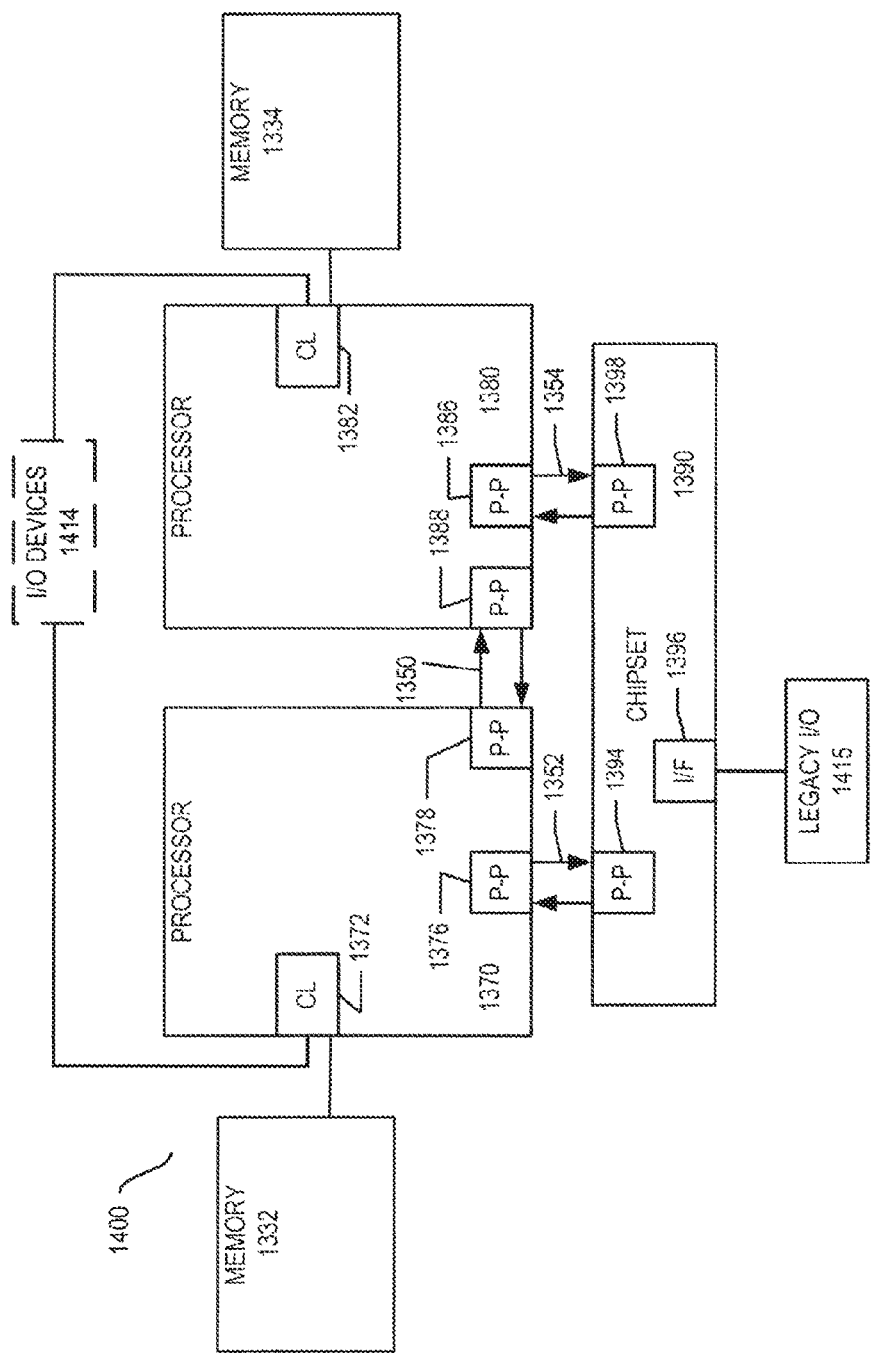
FIG. 14 is a block diagram of a second more specific exemplary system in accordance with an embodiment of the present invention.

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
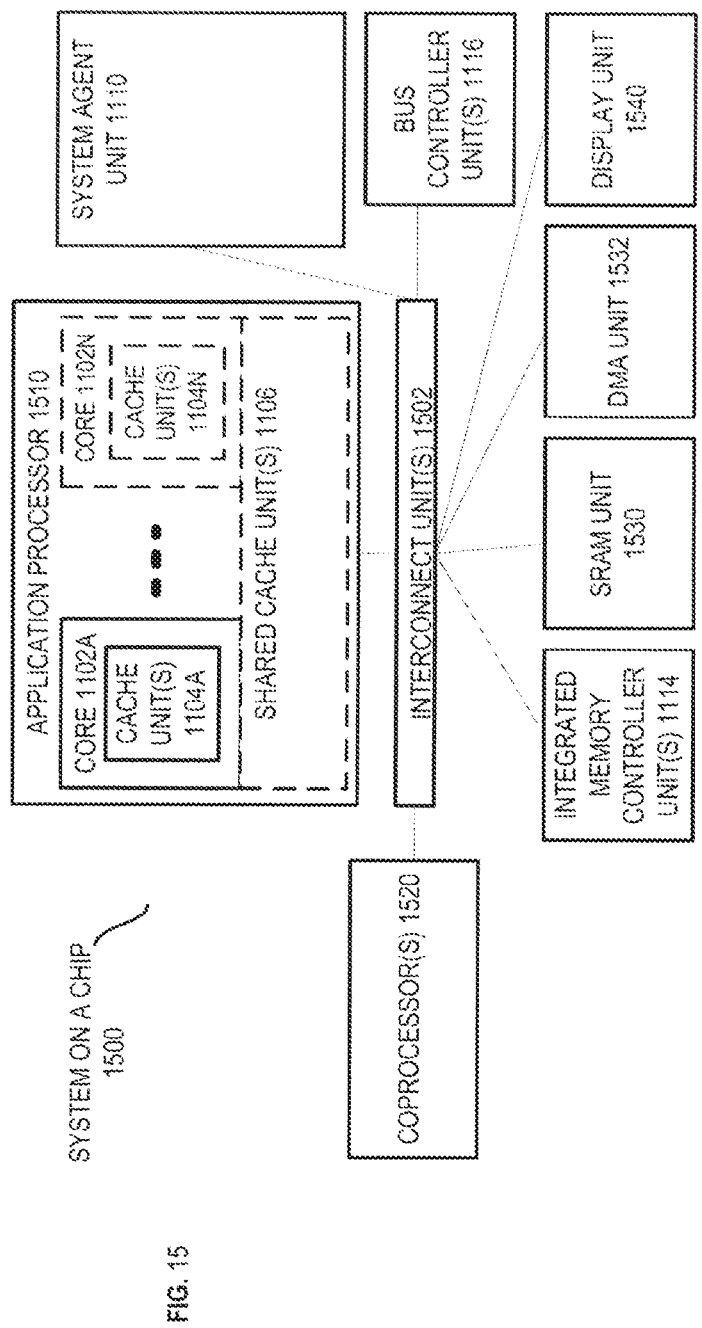
FIG. 15 is a block diagram of a SoC in accordance with an embodiment of the present invention.

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 202A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
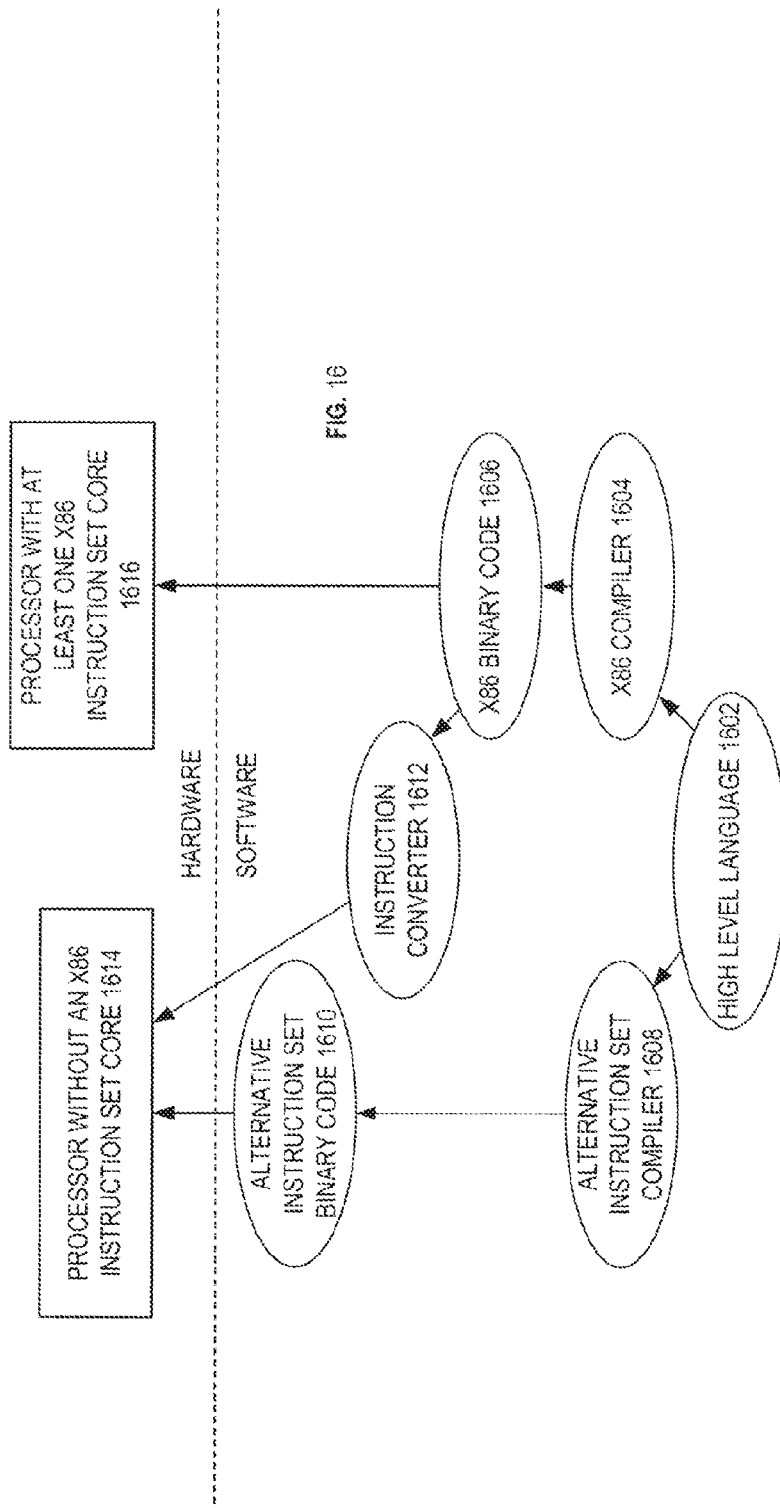
FIG. 16 is a block diagram contrasting the use of a software instruction converter to convert binary instructions in a source instruction set to binary instructions in a target instruction set according to embodiments of the invention.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

What is claimed is:

1. A method comprising:
    decoding a single instruction having fields to identify a source register operand and a destination register operand;
    executing the decoded single instruction to store the set writemask bits of the identified source register operand into consecutive least significant bit positions of the identified destination register operand and zero all other bit positions of the identified destination register operand.

2. The method of claim 1, wherein the identified source and destination register operands are 16-bit registers each having 16 writemasks.

3. The method of claim 1, wherein the identified source and destination register operands are 64-bit registers each having 64 write masks.

4. The method of claim 1, wherein an opcode sets a number writemask bits of the identified source register operands to potentially store.

5. The method of claim 1, wherein all bits of the identified source and destination register operands are writemask bits.

6. The method of claim 5, wherein only the eight least significant writemask bits of the identified source register operand are to be evaluated for determining which of the writemask bits of the identified source register operand are to be written into the least significant bit positions of the identified destination register operand.

7. The method of claim 1, wherein the executing further comprises:
    determining if a least significant bit position of the identified source register operand is 1;
        when the a least significant bit position of the source register operand is 1, writing a 1 into a least significant bit position of the destination register operand that does not have a 1 already stored there; and when the a least significant bit position of the identified source register is 0, determining if a next least significant bit position of the identified source register operand is 1 when the a least significant bit position of the identified source register is operand 0.

8. An article of manufacture comprising:
a non-transitory machine-readable storage medium having stored thereon an occurrence of an instruction, wherein the instruction's format specifies as its only source operand a source operand a single register and specifies as its destination a single register, and wherein the instruction format includes an opcode which instructs a machine, responsive to a decoded single occurrence of the single instruction, to cause set writemask bits of the source operand to be written into one or more least significant bits of the destination operand and zero all other bit positions of the destination register operand.

9. The article of manufacture of claim 8, wherein the registers are 16-bit registers each having 16 writemasks.

10. The article of manufacture of claim 8, wherein the registers are 64-bit registers each having 64 writemasks.

11. The article of manufacture of claim 8, wherein the opcode sets a number writemask bits of the source register to potentially store.

12. The article of manufacture of claim 11, wherein all bits of the source and destination operands are writemask bits.

13. The article of manufacture of claim 11, wherein only the eight least significant writemask bits of the source are to be evaluated for determining which of the writemask bits of the source are to be written into the least significant bit positions of the destination.

14. An apparatus comprising;
a hardware decoder to decode an instruction, wherein the instruction includes an identifier for a source register operand, an identifier for a destination register operand, and an opcode;
execution circuitry to set writemask bits of the source register operand into consecutive least significant bit positions of the destination register operand and zero all other bit positions of the destination register operand.

15. The apparatus of claim 14, wherein the register operands are 16-bit registers each having 16 writemasks.

16. The apparatus of claim 14, wherein the register operands are 64-bit registers each having 64 writemasks.

17. The apparatus of claim 14, wherein the opcode sets a number writemask bits of the identified source register operand to potentially store.

18. The apparatus of claim 14, the execution circuitry is further to set all writemask bits of the identified destination register operand to be 0 prior to determining which writemask bits of the identified source register operand are to be written into the least significant bit positions of the destination register operand.

* * * * *